US012768337B2

(12) United States Patent
Park et al.

(10) Patent No.: US 12,768,337 B2
(45) Date of Patent: Oct. 20, 2026

(54) SPRING-WOVEN FABRIC, MANUFACTURING METHOD THEREFOR, FLEXIBLE ACTUATOR USING SAME, WEARABLE ROBOT COMPRISING FLEXIBLE ACTUATOR, AND MASSAGE DEVICE COMPRISING FLEXIBLE ACTUATOR

(71) Applicant: KOREA INSTITUTE OF MACHINERY & MATERIALS, Daejeon (KR)

(72) Inventors: Cheol-hoon Park, Daejeon (KR); Seyoung Kim, Anyang-si (KR); Sung-Hyuk Song, Daejeon (KR); Hyunuk Seo, Seoul (KR); Hyun Mok Jung, Daejeon (KR); Kyungjun Choi, Daejeon (KR); Seongjun Park, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 445 days.

(21) Appl. No.: 18/272,023

(22) PCT Filed: Aug. 17, 2021

(86) PCT No.: PCT/KR2021/010892

§ 371 (c)(1),
(2) Date: Jul. 12, 2023

(87) PCT Pub. No.: WO2022/203133

PCT Pub. Date: Sep. 29, 2022

(65) Prior Publication Data

US 2024/0068452 A1 Feb. 29, 2024

(30) Foreign Application Priority Data

Mar. 26, 2021 (KR) ........................ 10-2021-0039742
Mar. 30, 2021 (KR) ........................ 10-2021-0040993

(51) Int. Cl.
*F03G 7/06* (2006.01)
*D03D 15/67* (2021.01)
(Continued)

(52) U.S. Cl.
CPC ........... *F03G 7/0616* (2021.08); *D03D 15/67* (2021.01); *D03D 15/68* (2021.01); *D03D 17/00* (2013.01);
(Continued)

(58) Field of Classification Search
None
See application file for complete search history.

(56) References Cited

FOREIGN PATENT DOCUMENTS

JP H11-286849 A 10/1999
JP 2005-506874 A 3/2005
(Continued)

OTHER PUBLICATIONS

International Search Report issued on Dec. 20, 2021, for corresponding International Patent Application No. PCT/KR2021/010892, along with an English translation (6 pages).
(Continued)

*Primary Examiner* — Arti Singh-Pandey
(74) *Attorney, Agent, or Firm* — Hauptman Ham, LLP

(57) ABSTRACT

In a spring-woven fabric, a manufacturing method for the spring-woven fabric, a flexible actuator using the spring-woven fabric, a wearable robot comprising the flexible actuator, and a massage device comprising the flexible actuator, the spring-woven fabric is configured to be contracted or relaxed by external power supply. The fabric
(Continued)

includes a thermal response drive element and a wire. The thermal response drive element has a spring shape, and is configured to function as one of a warp and a weft. The wire is configured to function as the remaining of the warp and the weft.

19 Claims, 15 Drawing Sheets

(51) Int. Cl.
*D03D 15/68* (2021.01)
*D03D 17/00* (2006.01)

(52) U.S. Cl.
CPC .......... *F03G 7/06145* (2021.08); *F03G 7/064* (2021.08)

(56) References Cited

FOREIGN PATENT DOCUMENTS

| | | | |
|---|---|---|---|
| JP | 2005-304960 | A | 11/2005 |
| JP | 2007-510815 | A | 4/2007 |
| KR | 10-2010-0075341 | A | 7/2010 |
| KR | 10-2011-0024977 | A | 3/2011 |
| KR | 10-2019-0077646 | A | 7/2019 |
| KR | 10-2019-0103100 | A | 9/2019 |
| KR | 10-2021-0000142 | A | 1/2021 |
| KR | 10-2021-0114180 | A | 9/2021 |
| WO | 2020/262802 | A1 | 12/2020 |

OTHER PUBLICATIONS

Written Opinion issued on Dec. 20, 2021, for corresponding International Patent Application No. PCT/KR2021/010892 (5 pages).

SPRING-WOVEN FABRIC, MANUFACTURING METHOD THEREFOR, FLEXIBLE ACTUATOR USING SAME, WEARABLE ROBOT COMPRISING FLEXIBLE ACTUATOR, AND MASSAGE DEVICE COMPRISING FLEXIBLE ACTUATOR

CROSS-REFERENCE TO RELATED APPLICATION

The present application is a national stage filing under 35 U.S.C. § 371 of PCT application number PCT/KR2021/010892 filed on Aug. 17, 2021, which is based upon and claims the benefit of priorities to Korean Patent Application No. 10-2021-0039742 filed on Mar. 26, 2021 and Korean Patent Application No. 10-2021-0040993 filed on Mar. 30, 2021, in the Korean Intellectual Property Office, which are incorporated herein in their entireties by reference.

BACKGROUND OF THE INVENTION

Technical Field

Exemplary embodiments of the present invention relate to a spring-woven fabric, a manufacturing method for the spring-woven fabric, a flexible actuator using the spring-woven fabric, a wearable robot comprising the flexible actuator, and a massage device comprising the flexible actuator, and more specifically Exemplary embodiments of the present invention relate to a spring-woven fabric, a manufacturing method for the spring-woven fabric, a flexible actuator using the spring-woven fabric, a wearable robot comprising the flexible actuator, and a massage device comprising the flexible actuator, capable of generating large force, having high response easy cooling, and improving manufacturability, due to the weave of SMA spring which is a spring type thermal response element.

Discussion of the Related Art

Generally, industrial workers, stevedoring workers, courier workers, etc. often carry out an action of repeatedly lifting and moving heavy objects.

These works require a number of manpower, or there is inconvenience in that auxiliary equipment such as heavy equipment, cranes, and pulleys should be used according to field conditions. In addition, the high work intensity increases worker fatigue and lower work efficiency when a person directly works, and there are problems with occupational accidents such as musculoskeletal injuries and avoidance of related occupations. In addition, in the case of using auxiliary equipment, since a relatively large moving space or installation space is required, there is a problem in that the range of use is limited.

Thus, the need for a wearable muscle strength assisting device to alleviate a motion of standing up with a repetitive load or a motion of enduring a heavy load is emerging.

Most of the recently developed muscle strength assistive devices are driven by attaching them to the side of an arm or leg using a motor and a frame.

However, this type of muscle assist device is composed of a frame or a motor for driving various frames, and is heavy and hard, which hinders natural movement and is uncomfortable to wear.

Therefore, it is required to develop a wearable robot (clothing for strengthening muscle strength) that is light in weight, attached to a position similar to human body muscle, does not interfere with body movement, and can improve responsiveness of various motions. Related prior art is Koran-laid open patent No. 10-2019-0103100.

SUMMARY

Exemplary embodiments of the present invention provide a spring-woven fabric, capable of generating large force, having high response easy cooling, and improving manufacturability, due to the weave of SMA spring which is a spring type heat response element.

Exemplary embodiments of the present invention also provide a manufacturing method for the spring-woven fabric.

Exemplary embodiments of the present invention also provide a flexible actuator using the spring-woven fabric.

Exemplary embodiments of the present invention also provide a wearable robot having the flexible actuator.

Exemplary embodiments of the present invention also provide a massage device having the flexible actuator.

According to an example embodiment of the present invention, the spring-woven fabric is configured to be contracted or relaxed by external power supply. The fabric includes a thermal response drive element and a wire. The thermal response drive element has a spring shape, and is configured to function as one of a warp and a weft. The wire is configured to function as the remaining of the warp and the weft.

In an example, the thermal response drive element may be a shape memory alloy (SMA) spring.

In an example, wherein the SMA spring may have flexibility and may be woven in close contact with each other within the fabric, and the wire may be configured to fix the SMA spring.

According to another example embodiment of the present invention, the manufacturing method for a fabric includes continuously winding a wire corresponding to a thermal response drive element around a core wire to be removed later, in a form of a spring, heat-treating the wire in the form of the spring wound around the core wire and storing the wire in a spring-shaped form, weaving the fabric using a separately prepared non-conductive wire and the spring-shaped wire wound around the core wire, and removing the core wire from the woven fabric.

In an example, in weaving the fabric, the spring-shaped wire wound around the core wire may be used as one of a warp and a weft, and the non-conductive wire may be used as the remaining of the warp and the weft.

In an example, in removing the core wire, the core wire may be dissolved and removed by acid.

According to still another example embodiment of the present invention, a flexible actuator includes a fabric and a controller. The fabric includes a thermal response drive element and a wire. The thermal response drive element has a spring shape and is configured to function as one of a warp and a weft, and the wire is configured to function as the remaining of the warp and the weft. The controller is configured to control a power supply to the fabric. The fabric is configured to contracted or relaxed by the power supply.

In an example, the fabric may be contracted or relaxed along a direction in which the thermal response drive element having the spring shape extends.

In an example, the flexible actuator may further include a relaxation length limiting part configured to limit a relaxation length of the fabric.

In an example, the relaxation length limiting part may be a wire extending along an extending direction of the fabric from at least one of both sides of the fabric.

In an example, the flexible actuator may further include an outer part configured to cover at least one side of the fabric to locate the fabric inside, and configured to limit the relaxation length of the fabric.

In an example, the flexible actuator may further include a conductive pad overlapping with an end of the fabric and electrically connected to the fabric, and a current receiver connected to the conductive pad and configured to provide the power supply to the conductive pad.

In an example, the conductive pad may be fixed to a supporting fabric, and the supporting fabric may be contracted or relaxed according to the contraction or the relaxation of the fabric.

In an example, the flexible actuator may further include a cooling part configured to provide an air in a direction crossing an extending direction of the thermal response drive element of the fabric, to cool the fabric.

In an example, the cooling part may be an air pocket configured to provide an external air toward the fabric. The air pocket may include an air inlet through which the external air is introduced, and an air outlet through which the introduced air is discharged toward the fabric.

In an example, the cooling part may be an external air supplier disposed at a side surface of the flexible actuator, and an area in which the external air supplier is located may overlap with an area in which the fabric is located.

In an example, the external air supplier may be located to overlap with an area in which the fabric is located with the fabric contracted.

In an example, the outer part may have a porous material through which the air provided to the fabric passes.

According to still another example embodiment of the present invention, the wearable robot includes a cloth body and the flexible actuator connected to the cloth body or integrally formed with the cloth body. A first side of the flexible actuator may be disposed at a first body fixing portion and a second side of the flexible actuator may be disposed at a second body fixing portion, and the second body fixing portion may be disposed opposite to the first body fixing portion with respect to a position corresponding to a joint in the cloth body.

According to still another example embodiment of the present invention, the massage device includes an elastic band and the flexible actuator connected to the elastic band.

According to exemplary embodiments of the present invention, the SMA spring fabric is tightly woven, so that a large number of the SMA springs per unit area may be arranged with uniform density. In addition, the large number of the SMA spring arrangement enables larger force to be generated, and the uniform SMA spring arrangement also improves cooling performance.

Here, the SMA spring fabric may be easily woven through the conventional weaving machine, and thus productivity and the process efficiency may be increased. In addition, the user may redesign the fabric into various shapes or sizes, if the form of the fabric is provided to the user. Thus, the design freedom may be increased and the usability may be excellent.

In addition, the cooling air is provided along a direction perpendicular to the extending direction of the SMA spring fabric, so that the SMA spring fabric may be cooled rapidly. Thus, the response of the flexible actuator in the relaxation operation may be improved.

<reference numerals>

Figure 1:
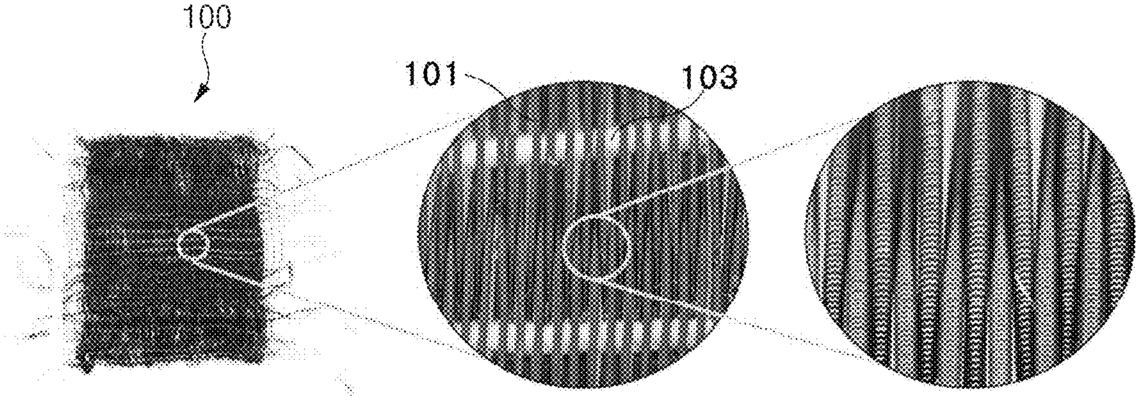
FIG. 1 is an image showing a spring-woven fabric enlarged by part according to the present example of the present invention.

| | |
|---|---|
| 10, 11, 12: flexible actuator | 20: wearable robot |
| 30: massage device | 100: SMA spring fabric |
| 101: SMA spring | 102: base wire (core wire) |
| 103: wire | 200, 210, 220, 230, 240: conductive pad |
| 300: controller | 400: relaxation length limiting part |
| 401: outer part | 500: supporting fabric |
| 600: manufacturing device for SMA spring | 710: external air supplier |
| 720: air pocket | |

DETAILED DESCRIPTION OF THE INVENTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as “beneath,” “below,” “lower,” “above,” “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the term “below” can encompass both an orientation of above and below. The device may be otherwise oriented (rotated 90 degrees or at other orientations) and the spatially relative descriptors used herein interpreted accordingly. The terminology used herein is for the purpose of describing particular embodiments only and is not intended to be limiting of the invention. As used herein, the singular forms “a,” “an” and “the” are intended to include the plural forms as well, unless the context clearly indicates otherwise.

It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention is described more fully hereinafter with reference to the accompanying drawings, in which embodiments of the invention are shown.

FIG. 1 is an image showing a spring-woven fabric enlarged by part according to the present example of the present invention.

Referring to FIG. 1, a fabric 100 woven with a shape memory alloy (SMA) spring having a spring shape (hereinafter, the SMA spring fabric) performs a thermal response drive element, and the SMA spring fabric may be included in a flexible actuator explained below.

Generally, the thermal response drive element is a material capable of converting thermal energy into mechanical energy such as a driving force or a displacement, and is widely used for an artificial muscle.

A shape memory alloy wire (hereinafter, SMA wire) which is one of the thermal response drive element is a material that is deformed by applying stress to a material in a low-temperature martensite state and then restored to its original shape when heated to a high-temperature austenite state.

Alternatively, the thermal response drive element may be a various thermal response material responsive to a heat, such as a shape memory resin, a shape memory polymer (SMP), a carbon nanotube, polyethylene, polyamide, nylon and so on.

However, hereinafter, as for the thermal response drive element, an example of the SMA wire implemented as the SMA spring will be explained.

If the SMA wire having a contraction displacement of 2% to 5% is manufactured in the form of a spring, the contraction displacement may be improved to 40% or more.

The SMA spring has a high heating and contraction speed, but a slow cooling speed, so there is a limit to improve the relaxation speed, which slows down the overall driving speed.

The thinner the diameter of the SMA wire used to manufacture the SMA spring, the faster the heating rate and the higher the ratio of surface area to volume, so the cooling rate may also be improved.

For example, a 0.08 mm fine diameter SMA wire may have a cross-sectional area of 1/39 of a 0.5 mm coarse diameter SMA wire, increasing the ratio of surface area to the unit volume by 6.25 times. Since the load capacity decreases by the ratio of the cross-sectional area, theoretically 39 SMA springs made of 0.08 mm diameter SMA wire are required to exert the load capacity of one SMA spring made of 0.5 mm diameter SMA wire.

In the case of fabricating a cloth-type actuator with a driving force of 10 kgf with the SMA spring having 0.5 mm diameter SMA wire, dozens (e.g., 20) of the SMA springs may be used, but a feeling of heterogeneity and discomfort will be inevitable when a user wears an actuator assembly having such plurality of the springs.

On the other hand, in order to have a corresponding driving force of 10 kgf of the cloth-type actuator made of the SMA spring having the 0.5 mm diameter SMA wire, hundreds of the SMA springs should be used in the case of the SMA spring of 0.08 mm diameter wire.

Thus, the example embodiments of the present invention described later may be a solution to the development requirements of a new type of cloth-type actuator and manufacturing process using the SMA spring of such a large number of fine-diameter wires.

Here, although the diameters of the wires constituting the SMA spring are 0.5 mm and 0.08 mm as examples, they are not necessarily limited to these diameters.

As the number of methods that did not need to be considered in the past has increased due to the thinning of the wire, new manufacturing methods and configurations are needed. Therefore, even the wire having a diameter larger than 0.5 mm may be sufficiently applied to the example embodiments, and as described later, all wires having a diameter that may be woven into a fabric form may be applied to the example embodiments of the present invention.

Accordingly, in the present example embodiment, using these fine SMA springs as yarns of a fabric, the thermal response drive element is woven into a single integrated fabric form like a fabric.

The SMA spring fabric 100 as illustrated in FIG. 1 includes a SMA spring 101 which is a warp (or a weft), and a wire 103 which is the weft (or the wrap).

The wire 103 configured to function as either the weft or the wrap is for fixing the plurality of SMA springs 101 in a plane, and does not necessarily have to be densely formed, and may be formed at intervals that do not interfere with the contraction and relaxation operation of the SMA spring. In addition, the wire 103 is sufficient if it is a material that satisfies the condition of not reacting during acid treatment, in consideration of the acid treatment process after weaving.

Figure 4:
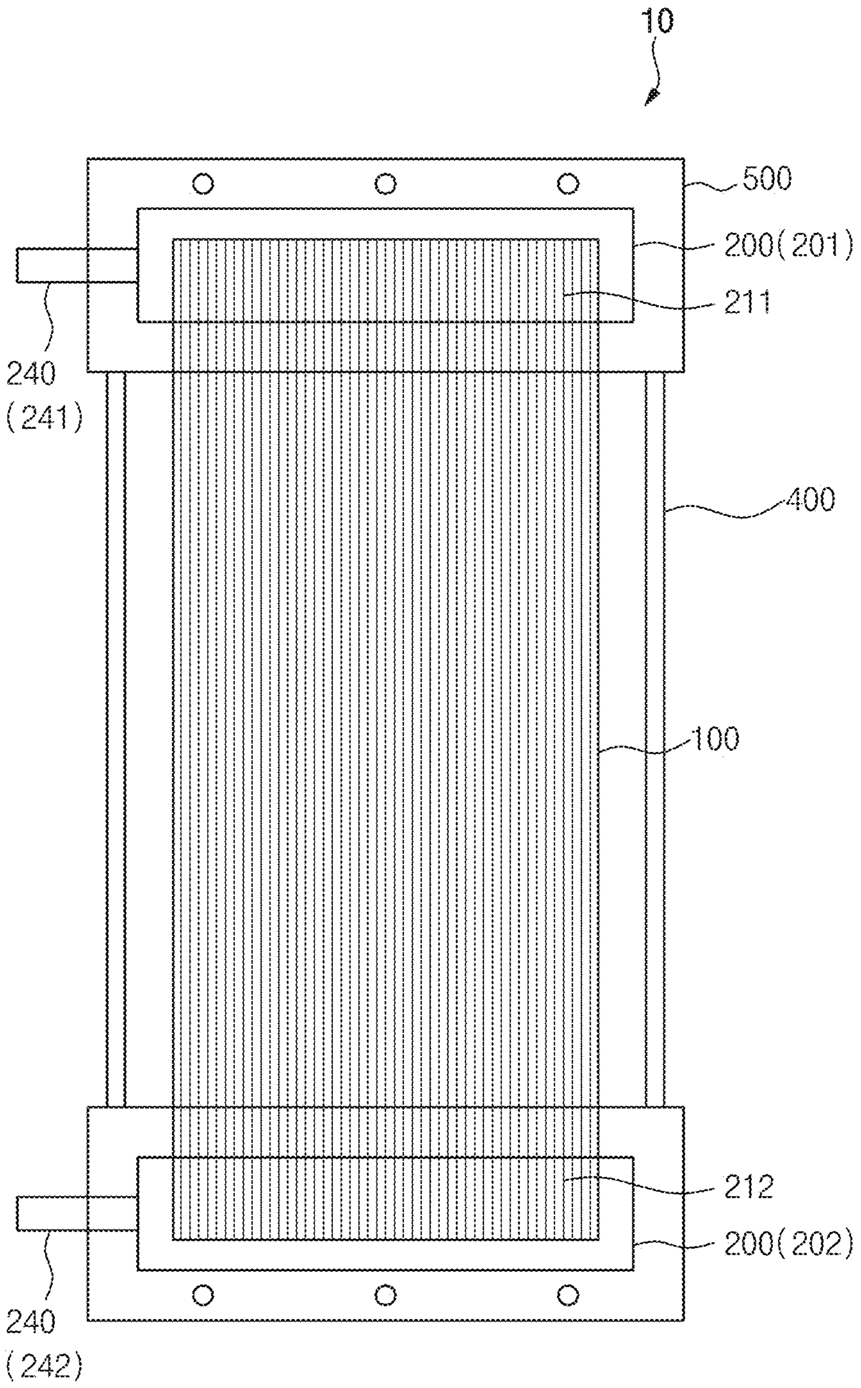
FIG. 4 is a plan view illustrating a flexible actuator using the spring-woven fabric of FIG. 1.

In addition, as shown in FIG. 4, the SMA springs are woven in close contact with each other in a flexible fabric. In this way, by densely weaving the SMA springs like warps or wefts in a cloth, it is possible to arrange a large number of the SMA springs per unit area with a uniform density, and a large number of the SMA springs may be arranged to generate a large force. In addition, cooling performance is also improved due to the uniform arrangement of the SMA springs.

Since the thermal reaction drive element 100 may be manufactured through the same process as a general weaving machine (textile machine), mass production through automation is possible, and when provided to the user in the form of the fabric, the degree of freedom in design such as a desired shape, a size and so on also increases.

For example, hundreds of the SMA springs may be gathered to form the SMA spring fabric 100 as a single module. Here, if the micro-diameter SMA wire-based fabric is used, while maintaining the existing driving force, a considerable portion of the flexibility of the fabric is maintained, so that there is no sense of difference in wearing, and in particular, a fast response may be realized by improving the cooling speed. As with the wire diameter, the same is true for the number of springs that make up the fabric. In addition, the number of springs constituting the SMA spring fabric 100 may vary from several to hundreds, and the number is not limited thereto.

Figure 2:
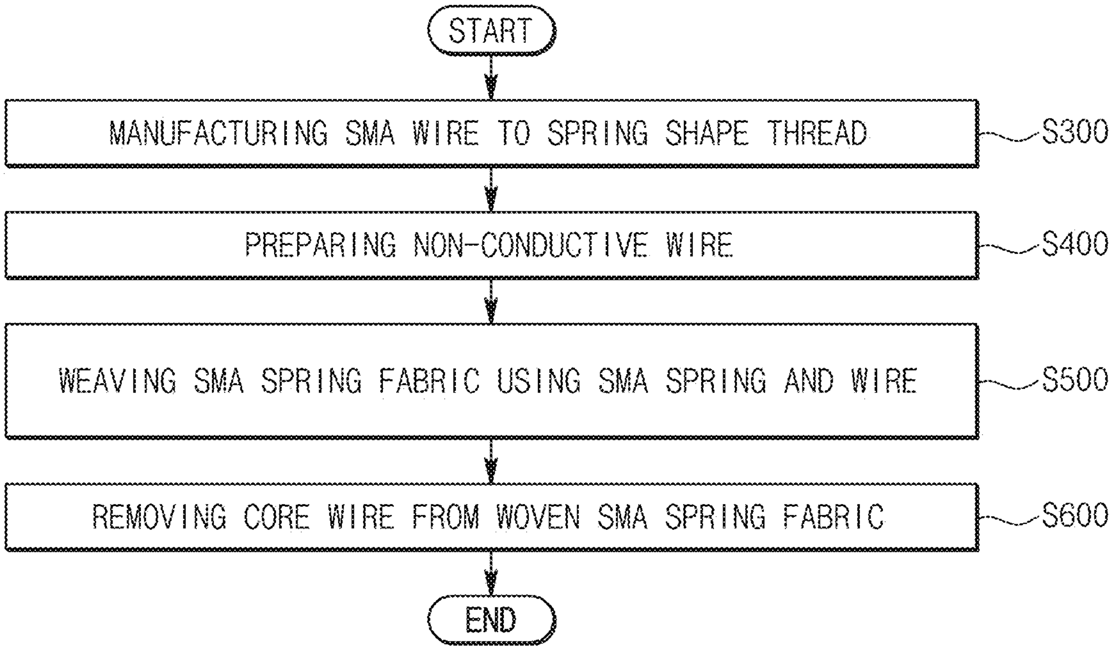
FIG. 2 is a flow chart illustrating a manufacturing method for the spring-woven fabric of FIG. 1.
Figure 3A:
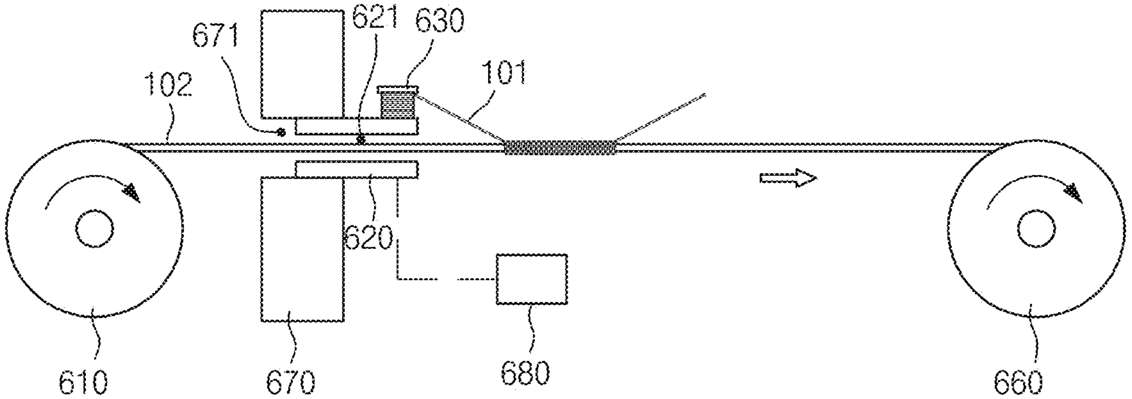
FIG. 3A is a schematic view illustrating a manufacturing device for manufacturing a spring yarn, which is a manufacturing device for a SMA spring, in the spring-woven fabric of FIG. 2.
Figure 3B:
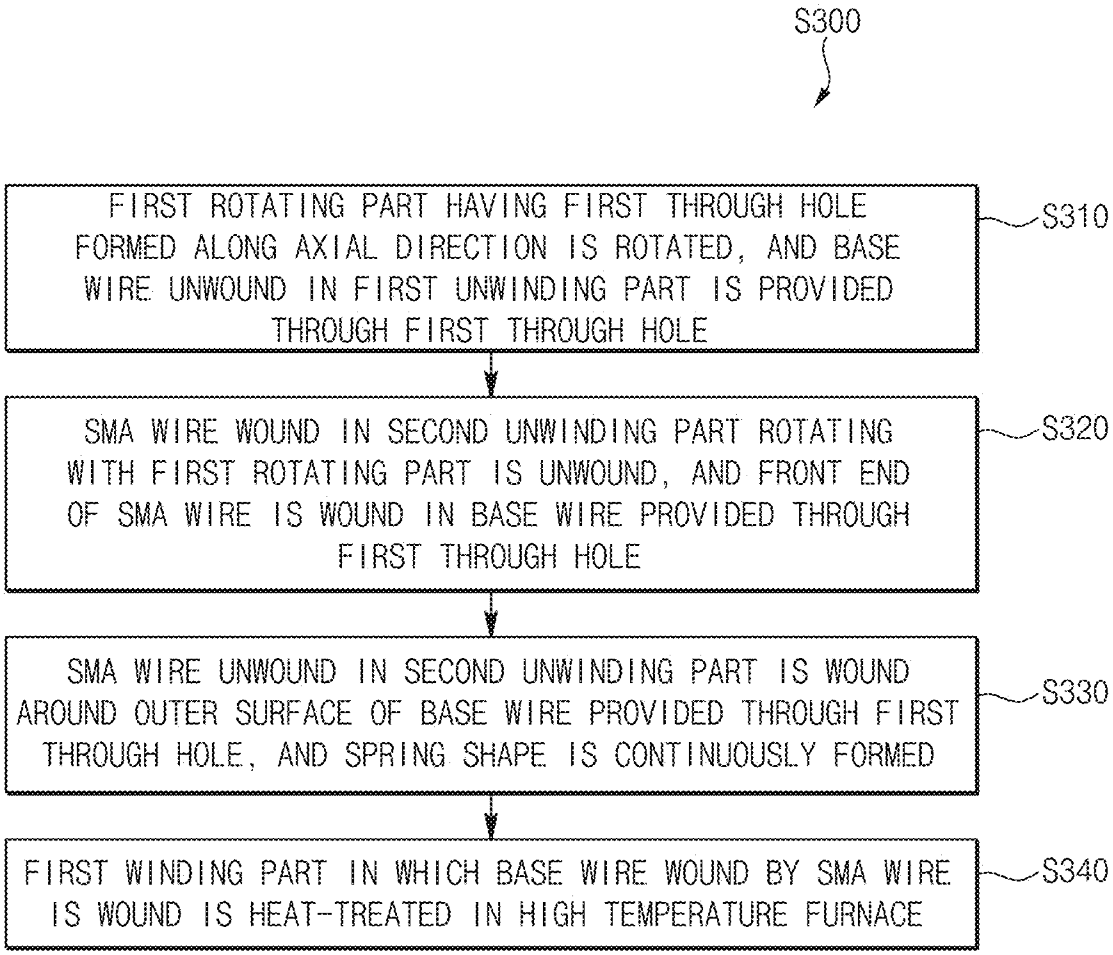
FIG. 3B is a flow chart illustrating a manufacturing method for the spring yarn, which is a manufacturing method for the SMA spring, using the manufacturing device of FIG. 3A.

FIG. 2 is a flow chart illustrating a manufacturing method for the spring-woven fabric of FIG. 1. FIG. 3A is a schematic view illustrating a manufacturing device for manufacturing a spring yarn, which is a manufacturing device for a SMA spring, in the spring-woven fabric of FIG. 2, and FIG. 3B is a flow chart illustrating a manufacturing method for the spring yarn, which is a manufacturing method for the SMA spring, using the manufacturing device of FIG. 3A.

In the manufacturing method of the SMA spring fabric 100, the SMA spring is used as one 101 of the warp and the weft, and the wire (e.g., general fiber thread) is used as the remaining 103 of the warp and the weft transverse, and then the SMA spring fabric 100 composed of the warp and the weft is woven.

For example, referring to FIG. 2, the manufacturing method of the SMA spring fabric 100 includes manufacturing the SMA wire to a spring shape thread (step S300), preparing a non-conductive wire (step S400), and weaving the SMA spring fabric using the SMA spring and the wire (step S500).

In the manufacturing the SMA wire corresponding to a thermal response drive element to the spring shape thread (step S300), the SMA wire is continuously wound around a core wire (a base wire) to be removed later, and the wire in the form of the spring wound around the core wire is heat-treated and is stored in a spring-shaped form. Thus, the SMA spring 101 is fabricated.

The process of making the SMA spring which is one of the yarns constituting the fabric, to a wire or a thread is not limited to a specific manufacturing method, but the method disclosed in Korean Patent Application No. 10-2020-0029517, which is incorporated herein by reference in its entirety, may be applied.

For example, the method of manufacturing the SMA wire into the spring-shaped thread, that is the method of manufacturing the SMA spring, as illustrated in FIG. 5B of the prior art, may include supplying the base wire (the core wire) made of a metal that has a melting point of 500° C. or higher and dissolves by reacting with an acid or an aqueous hydrogen peroxide solution, winding the SMA wire on the supplied base wire, continuously forming the spring shape in which the SMA wire is wound around the base wire, and heat-treating a bobbin on which the base wire wound by the SMA wire is wound in a high temperature furnace.

Referring to FIG. 3A, the manufacture device for the SMA spring includes a first unwinding part 610, a first rotating part 620, a second unwinding part 630, and a first winding part 660.

A base wire (core wire) 102 is unwound in the unwinding part 610. The base wire 102 has an outer diameter corresponding to an inner diameter of the SMA spring 101 which is to be manufactured.

The base wire 102 may include a material which dissolved by reacting with acid or hydrogen peroxide solution and has a melting point higher than the heat treatment temperature of the SMA spring 101.

For example, the base wire 102 may have a metal having a melting point over about 500° C. and dissolved by reacting with acid or hydrogen peroxide solution. The acid for dissolving the base wire 102 may be hydrofluoric acid, hydrochloric acid, boric acid, sulfuric acid, nitric acid, phosphoric acid, hydro-peroxide, acetic acid, propionic acid, diacetic acid, formic acid and so on.

For example, the base wire 102 may have at least one metal selected from the group consisting of Molybdenum (Mo), Tungsten (W), Nickel (Ni), Titanium (Ti), Iron (Fe), Chromium (Cr), Zirconium (Zr), Cobalt (Co), Platinum (Pt), Gold (Au), Silver (Ag), palladium (Pd), and their alloys.

The base wire 102 unwound from the first unwinding part 610 is rolled by the first winding part 660, and the base wire 102 is provided by a constant speed.

The first unwinding part 660 may be a bobbin made of a material that can withstand the heat treatment temperature of the SMA spring 101. The bobbin may be provided as a spool type or a reel type, and may include at least one material of metal, ceramic, silicon and glass that can withstand a temperature of about 500° C. or more. Here, the bobbin may include high corrosion resistance, high melting point metal material than can withstand a temperature of over 1,000° C.

The first rotating part 620 may be configured in a supply direction of the base wire 102 unwound from the first unwinding part 610. A first through hole 621 is formed through a center of the first rotating part 620. The base wire 102 is provided through the first through hole 621, and an inner diameter of the first through hole 621 may be larger than an outer diameter of the base wire 102.

The first rotating part 620 may be rotatably combined with a first supporting part 670. The first supporting part 670 is configured in a supply direction of the base wire 102 unwound from the first unwinding part 610. A first connecting hole 671 is formed through the first supporting part 670 in a supply direction of the base wire 102. The first rotating part 620 may be rotatably combined with the first supporting part 370, and the first through hole 621 has a central axis substantially same as that of the first connecting hole 671.

The first rotating part 620 is combined with the first supporting part 670 and is rotated with respect to the central axis of the first through hole 621.

The second unwinding part 630 is configured on an outer surface of the first rotating part 620. The second unwinding part 630 is configured to be rotated with respect to the central axis of the first rotating part 620 along a radial axis. Thus, the second unwinding part 630 is rotated with the rotation of the first rotating part 620 at the same time, and in addition, the second unwinding part 630 may be rotated in itself. The second unwinding part 630 may have a first rotation which is the rotation with respect to the central axis of the first rotating part 620, and a second rotation which is the rotation with respect to the central axis of the first rotating part 620 in the radial axis.

The SMA wire 101 is unwound from the second unwinding part 630. The SMA wire 101 unwound from the second unwinding part 630 is wound around an outer surface of the base wire 102 which is unwound from the first unwinding part 610 and then is provided through the first through hole 621 of the first rotating part 620. The SMA wire 101 may be a single wire rod. The SMA wire 101 may form a wire rod of the SMA spring, and the diameter of the wire rod of the SMA spring may be that of the SMA wire 101.

The diameter of the wire rod of the SMA spring 101 is not limited, but may be less than 1.0 mm, or preferably less than 0.5 mm, or more preferably less than 0.1 mm which is a thickness of the hair. Thus, the SMA wire 101 may be tied to the wire 102, and any additional fixing device may be unnecessary.

As a front end of the SMA wire unwound from the second unwinding part 630 is wound around the base wire 102, the base wire 102 is continuously provided and the first rotating part 620 is rotated, and thus the SMA wire 101 is wound around the outer surface of the base wire 102 along a longitudinal direction of the base wire 102. In addition, with the SMA wire 101 wound around the base wire 102, the base wire 102 is continuously provided and the second unwinding part 630 is rotated, and then the SMA wire 101 is continuously unwound.

The base wire 102 around which the SMA wire 101 is wound is rolled by the first winding part 660.

Referring to FIG. 3B, in the manufacturing method for the SMA spring 101, the first rotating part 620 having the first through hole 621 formed along the axial direction is rotated, and the base wire 102 unwound in the first unwinding part 610 is provided through the first through hole 621 (step S310). The base wire 102 may be provided with the constant speed. In the step S310, the base wire 102 unwound from the first unwinding part 610 is provided through the first rotating part 620 and then is rolled by the bobbin of the first winding part 660.

Then, the SMA wire 101 wound in the second unwinding part 630 which is rotated with the first rotating part 620 and is configured on the first rotating part 620 is unwound, and the front end of the SMA wire 102 is wound in the base wire 102 which is provided through the first through hole 621 (step S320).

In the step S320, the SMA wire 101 may control a deformation temperature with a large range, and an amount of the deformation of the SMA wire 101 is relatively large. In addition, shape memory effect ability of the SMA wire 101 may hardly change even after many repetitive motions during contraction. For example the SMA wire 101 may include nickel-titanium alloy or copper-titanium alloy, and may further include copper-zinc alloy, gold-cadmium alloy, indium-thallium alloy and so on.

Then, the SMA wire 101 unwound from the second unwinding part 630 is wound around an outer surface of the base wire 102 which is provided through the first rotating part 620, and then a spring shape is continuously formed (step S330).

In the step S330, the rotating speed and the rotating time of the first rotating part 620 may be controlled by the controller, and then a pitch, a length and so on of the spring may be adjusted.

After the step S320 and the step S330, the SMA spring 101 is formed on the base wire 102. The SAM wire 101 is rolled around the base wire 102 which is rolled by the bobbin of the first winding part 660.

Then, the bobbin of the first winding part 660 in which the base wire 102 wound by the SMA wire 101 is wound is heat-treated in a high temperature furnace (step S340).

In the step S340, the base wire 102 around which the SMA wire 101 rolled by the bobbin of the first winding part 660 is wound is heated in the high temperature furnace, and is heat-treated so as to be memorized in the spring shape.

Here, the base wire 102 around which the SMA wire 101 is wound may be heat-treated for about 30-60 min in the furnace of 300-400° C. The first winding part 660 may include the material capable of withstanding the heat treatment temperature required for the heat treatment process. For example, the first winding part 660 may include at least one material of metal, ceramic, silicon and glass. Thus, as the temperature of 300-400° C. is applied to the SMA spring with the SMA spring extended, the SMA spring is contracted to be returned to an initial shape.

After the above heat-treating, the base wire 102 around which the SMA wire 101 is wound may be obtained, and then the base wire 1025 with the SMA wire 101 may be use a warp or a weft for weaving the SMA spring fabric. The base wire which is the core wire is necessary for weaving, and then the core wire is removed using acid etc. after woven with the fabric type, and finally the SMA spring fabric 100 is completed.

Referring to FIG. 2 again, the SMA spring fabric 100 having the warp or the weft is woven, using the SMA spring 101 wound in the core wire and the non-conductive wire, via weaving technology such as a loom and a weaving machine (step S500). Here, the conventional weaving technology may be used and the detailed explanation for the conventional weaving technology may be omitted.

Then, the base wire 102 which is the core wire is removed from the woven SMA spring fabric 100 (step S600). As an example of the removal method, the entire fabric may be treated with the acid to melt the core wire.

As explained above, the base wire 102 may include a material that dissolves by reacting with acid or hydrogen peroxide solution, and the base wire 102 may be completely removed by dissolving in acid or hydrogen peroxide. Thus, the process of manually removing the base wire may not be required, and mass production and automation may become possible.

After the above processes, the SMA spring fabric 100, in which the SMA spring 101 and the wire 103 are composed of warp and weft, only remains.

Figure 5:
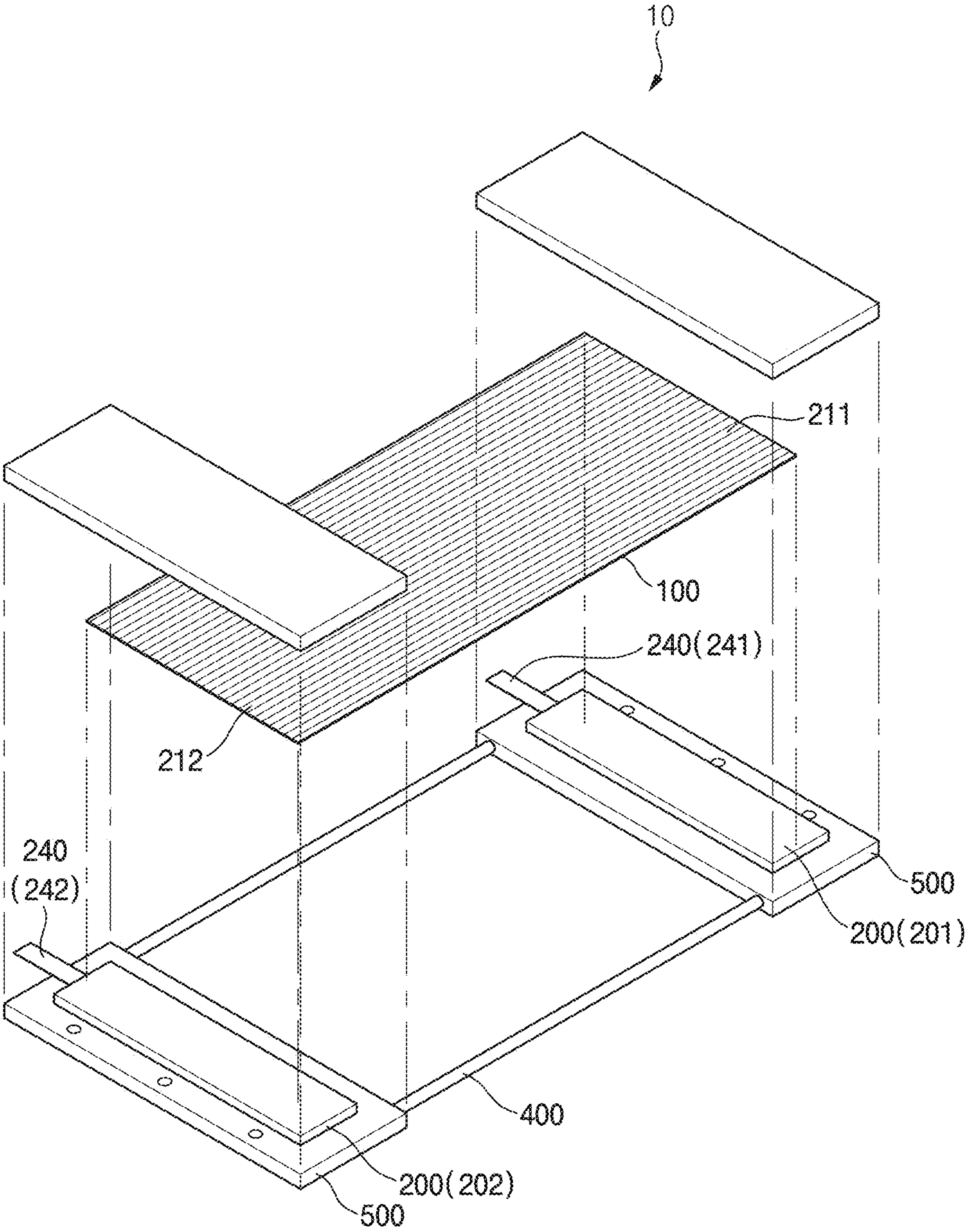
FIG. 5 is an exploded perspective view illustrating the flexible actuator of FIG. 4.

FIG. 4 is a plan view illustrating a flexible actuator using the spring-woven fabric of FIG. 1. FIG. 5 is an exploded perspective view illustrating the flexible actuator of FIG. 4.

Referring to FIG. 4 and FIG. 5, the flexible actuator 10 includes the SMA spring fabric 100, which is the spring woven fabric.

For example, the flexible actuator 10 includes a first conductive pad 201, a second conductive pad 202, the SMA spring fabric 100 and a relaxation length limiting part 400.

The first conductive pad 201 includes a first overlapping portion 211 electrically connected to a first side of the SMA spring fabric 100, and the second conductive pad 202 includes a second overlapping portion 212 electrically connected to a second side of the SMA spring fabric 100

An external current may be provided to a first side of the first conductive pad 201, and a current receiving part 241 forming an electric path with the first conductive pad 201 is formed at the first side thereof.

In addition, the current may be discharged from a first side of the second conductive pad 202, and a current providing part 242 forming an electric path with the second conductive pad 202 is formed at the first side thereof.

Thus, the external current is provided to the first conductive pad 201 through the current receiving part 241, and the current passing through the SMA spring fabric 100 and passing through the second conductive pad 202 is discharged to outside through the current receiving part 242. Thus, the electric current is generated in the flexible actuator 10.

Here, the SMA spring fabric 100 has an electric conductivity, and any additional conductive material or an electrode is not formed on the SMA spring fabric 100. It is enough for the first and second conductive pads 201 and 202 to be connected to both ends of the SMA spring fabric 100.

The first and second conductive pads 201 and 202 are fixed to the supporting fabric 500, so that the flexible actuator 10 may perform an operation for the supporting fabric 500.

As the current is provided, the SMA spring fabric 100 is contracted or relaxed, and thus the supporting fabric 500 may perform a certain operation according to the contraction or the relaxation of the SMA spring fabric 100.

Both ends of the relaxation length limiting part 400 are respectively connected to the supporting fabric 500 to which the first conductive pad 201 is fixed, and the supporting fabric 500 to which the second conductive pad 202. Here, the relaxation length limiting part 400 may extend to have a wire shape.

In addition, as illustrated in the figure, a pair of the relaxation length limiting parts 400 may be respectively connected to both sides of the SMA spring fabric 100. Alternatively, a single relaxation length limiting part 400 may be connected to one side of the SMA spring fabric 100.

Accordingly, the relaxation length limiting part 400 is fixed to the supporting fabric 500 and is extended, so that the extending length of the SMA spring fabric 100 may be limited within a predetermined range in a whole.

Figure 6A:
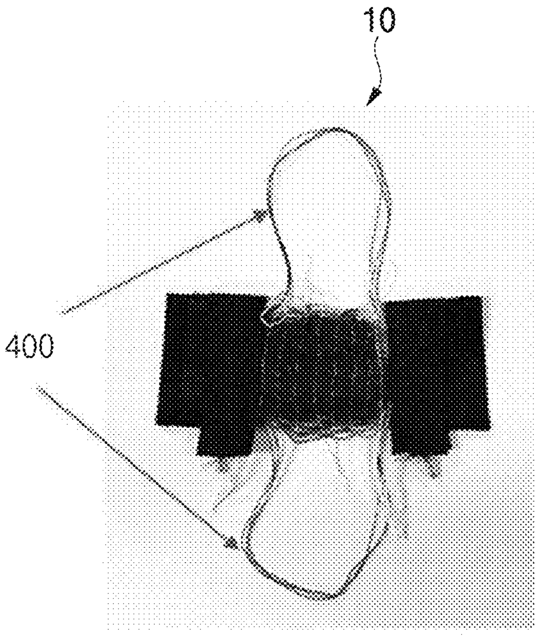
FIG. 6A and FIG. 6B are images showing contraction and relaxation states according to the operation of the flexible actuator of FIG. 4.
Figure 6B:
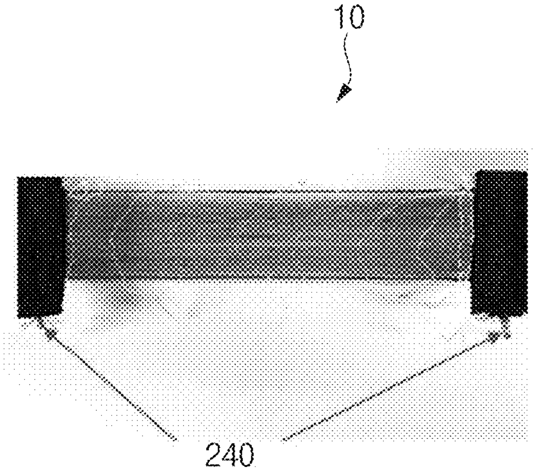

FIG. 6A and FIG. 6B are images showing contraction and relaxation states according to the operation of the flexible actuator of FIG. 4.

Referring to FIG. 6A, in the flexible actuator 10, when the SMA spring fabric 100 is heated and contracted, the relaxation length limiting part 400 is maintained to be curved outward.

In contrast, referring to FIG. 6B, in the flexible actuator 10, when the SMA spring fabric 100 is cooled and relaxed, the relaxation length limiting part 400 controls the relaxation length, and thus the relaxation is prevented from being additionally increased over a predetermined length.

Figure 7A:
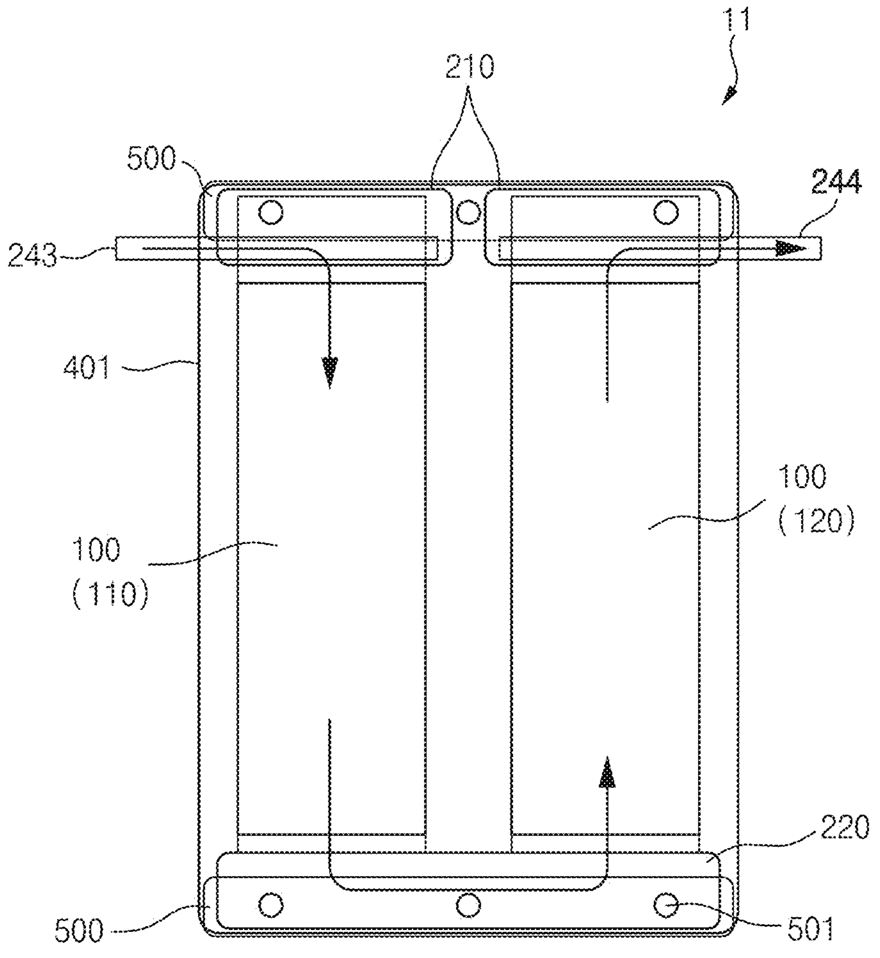
FIG. 7A and FIG. 7B are plan views illustrating flexible actuators according to another example embodiment of the present invention.
Figure 7B:
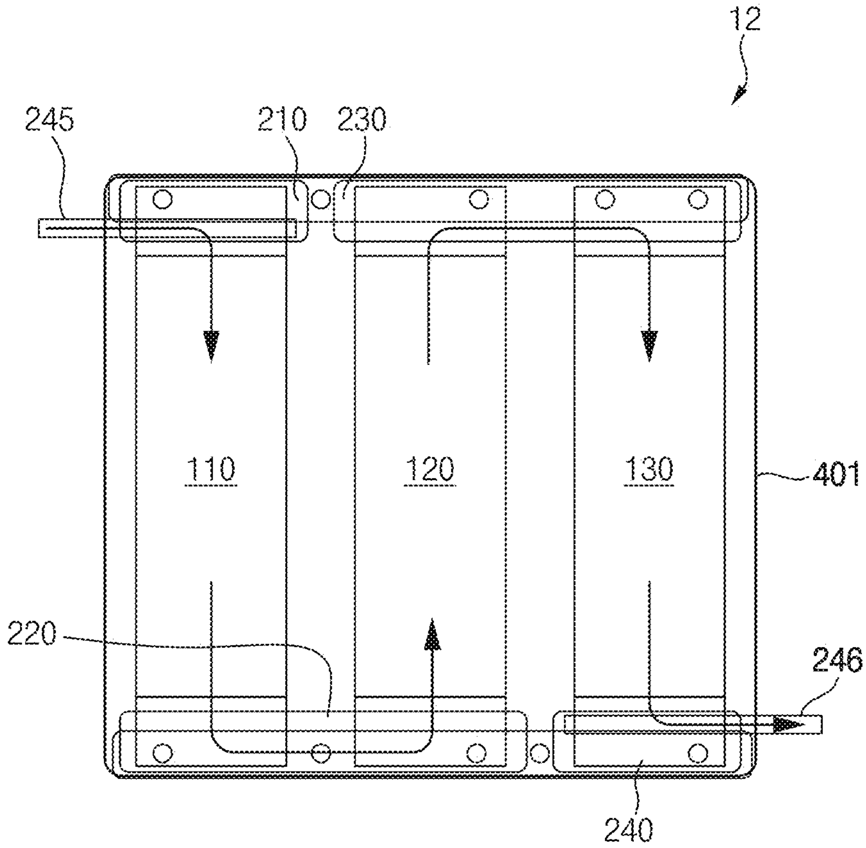

FIG. 7A and FIG. 7B are plan views illustrating flexible actuators according to another example embodiment of the present invention.

Referring to FIG. 7A, the flexible actuator 11 according to the present example embodiment includes a first SMA spring fabric 110, a second SMA spring fabric 120, a first conductive pad 210 and a second conductive pad 220.

Here, the first SMA spring fabric 110 is formed by weaving the SMA spring, which is substantially same as the SMA spring fabric 100 explained above referring to FIG. 4, and the first SMA spring fabric 110 is changed between the relaxation state and the contraction state due to the change of the temperature.

The second SMA spring fabric 120 is disposed adjacent to the first SMA spring fabric 110, and extends parallel with the first SMA spring fabric 110. Here, the second SMA spring fabric 120 is also formed by weaving the SMA spring, which is substantially same as the SMA spring fabric 100 explained above referring to FIG. 4, and the second SMA spring fabric 120 is changed between the relaxation state and the contraction state due to the change of the temperature.

The first conductive pad 210 is electrically connected to a first side of the first SMA spring fabric 110, and includes an overlapping portion for the electric connection, too, as explained above. In addition, the first conductive pad 210 is electrically connected to a first side of the second SMA spring fabric 120, and includes an overlapping portion for the electric connection.

However, in the present example embodiment, the first conductive pad 210 includes tow pads distinct from each other, and the first pad is electrically connected to the first SMA spring fabric 110 and the second pad is electrically connected to the second SMA spring fabric 120.

A current receiving part 243 is formed at a first side of the first conductive pad 210, and the current receiving part 243 receives an external current from outside and forms an electric path with the first conductive pad 201.

Here, the current receiving part 243 may be formed at a first side of the first conductive pad 210 electrically connected to the first SMA spring fabric 110.

In addition, a current providing part 244 may be formed at a second side of the first conductive pad 210 electrically connected to the second SMA spring fabric 120.

Thus, the external current is provided to the first conductive pad 201 through the current receiving part 243, passes through the first SMA spring fabric 110, and then is provided to the second SMA spring fabric 120 through the second conductive pad 202.

Then, the current passing through the second SMA spring fabric 120, passes through the first conductive pad 210 and is provided to outside through the current providing part 244. Thus, in a whole, the current path is formed as an arrow illustrated in FIG. 7*a* in the flexible actuator 11.

Here, the second conductive pad 220 is electrically connected to both the second side of the first SMA spring fabric 110 and the second side of the second SMA spring fabric 120. Here, it is unlike the first conductive pad 220 that is separated from each other and electrically connected, and thus the current path may be formed as explained above.

The first and second conductive pads 210 and 220 are fixed at the supporting fabric 500, and thus the flexible actuator 11 performs a predetermined operation on the supporting fabric 500.

That is, as the first and second SMA spring fabrics 110 and 120 are contracted or relaxed, the supporting fabric 500 is operated in connection with the contraction or the relaxation of the first and second SMA spring fabrics 110 and 120.

In the flexible actuator 11 according to the present example embodiment, in addition to the first conductive pad 210 configured as a front electrode receiving the external current or an end electrode discharging the current, the second conductive pad 220 which is an middle electrode electrically connecting the first and second spring fabrics 110 and 120 with each other should be configured.

In addition, the flexible actuator 11 may further include an outer part configured to cover the elements explained above.

The outer part 401 may be configured to cover one of the upper side or the lower side of the elements, and may be configured to cover both sides of the elements with a pair. For example, the outer part 401 may include a flexible material such as a fabric.

The outer part 401 covers and fixes the elements of the flexible actuator 11, and like the relaxation length limiting part 400 in FIG. 4 and FIG. 5, the outer part 401 prevents the first and second spring fabric 110 and 120 from being relaxed over a predetermined range.

As explained above, the first conductive pad 210 and the first and second SMA spring fabrics 110 and 120 overlap with each other to form an overlapping portion, and likewise, the second conductive pad 210 and the first and second SMA spring fabrics 110 and 120 overlap with each other to form an overlapping portion.

Here, the overlapping portion is an area in which individual unit springs and conductive pads of the first and second SMA spring fabrics 110 and 120 are physically in contact with each other so as to be electrically connected. Thus, the overlapping portion may be at least a portion of the conductive pad.

Generally, in the overlapping portion, the first and second spring fabrics 110 and 120 are fixed with the first and second conductive pads 210 and 220 via a method of sewing, etc.

The overlapping portion and the conductive pad are implemented by the supporting fabric 500. The supporting fabric 500 may be configured to a material less flexible than the outer part 401. The supporting fabric 500 may include an opening portion 501 for an eyelet, and the flexible actuator 10 may be connected to a connecting member (not shown) through the opening portion 501.

The supporting fabric 500 may be a fabric with high rigidity, such as a bag strap which fixes the eyelet and transmits an external force. Alternatively, the supporting fabric 500 may be replaced by the outer part.

The current receiving part 243 and the current providing part 244 may be formed as a wire or a conductive fabric exposed to outside for receiving the external current from outside or discharging the current to outside.

Referring to FIG. 7B, in the flexible actuator 12 according to the present example embodiment, three SMA spring fabrics are lined up in parallel, and first to fourth conductive pads 210, 220, 230 and 240 may be configured to form an current path.

The first conductive pad 210 forming the current receiving part 245 forms an overlapping portion with a first side of the first SMA spring fabric 110 and is electrically connected to the first SMA spring fabric 110.

The second conductive pad 220 forms an overlapping portion with a second side of the first SMA spring fabric 110 and is electrically connected to the first SMA spring fabric 110. At the same time, the second conductive pad 220 forms an overlapping portion with a second side of the second SMA spring fabric 120 and is electrically connected to the second SMA spring fabric 120.

In addition, the third conductive pad 230 is disposed adjacent to the first conductive pad 210. The third conductive pad 230 forms an overlapping portion with a first side of the second SMA spring fabric 120 and is electrically connected to the second SMA spring fabric 120. At the same time, the third conductive pad 230 forms an overlapping portion with a first side of the third SMA spring fabric 130 and is electrically connected to the third SMA spring fabric 130.

In addition, the fourth conductive pad 240 forms an overlapping portion with a second side of the third SMA spring fabric 230 and is electrically connected to the third SMA spring fabric 230. The current providing part 246 is formed in the fourth conductive pad 240.

Thus, the current path illustrated as an arrow is formed. The current received by the current receiving part 245, passes through the first conductive pad 210, the first SMA spring fabric 110, the second conductive pad 220, the second SMA spring fabric 120, the third conductive pad 230, the third SMA spring fabric 130, and the fourth conductive pad 240, and then is discharged through the current providing part 246.

Further, in the flexible actuator 12 according to the present example embodiment, in addition to the first and fourth conductive pads 210 and 240 configured as a front electrode receiving the external current or an end electrode discharging the current, the second and third conductive pads 220 and 230 which are middle electrodes electrically connecting the first to third spring fabrics 110, 120 and 130 with each other should be configured.

The flexible actuator 12 according to the present example embodiment is substantially same as the flexible actuator 11 of FIG. 7*a* except for the above explained arrangement of the spring fabrics, the connection between the conductive pads and the current path.

Figure 8:
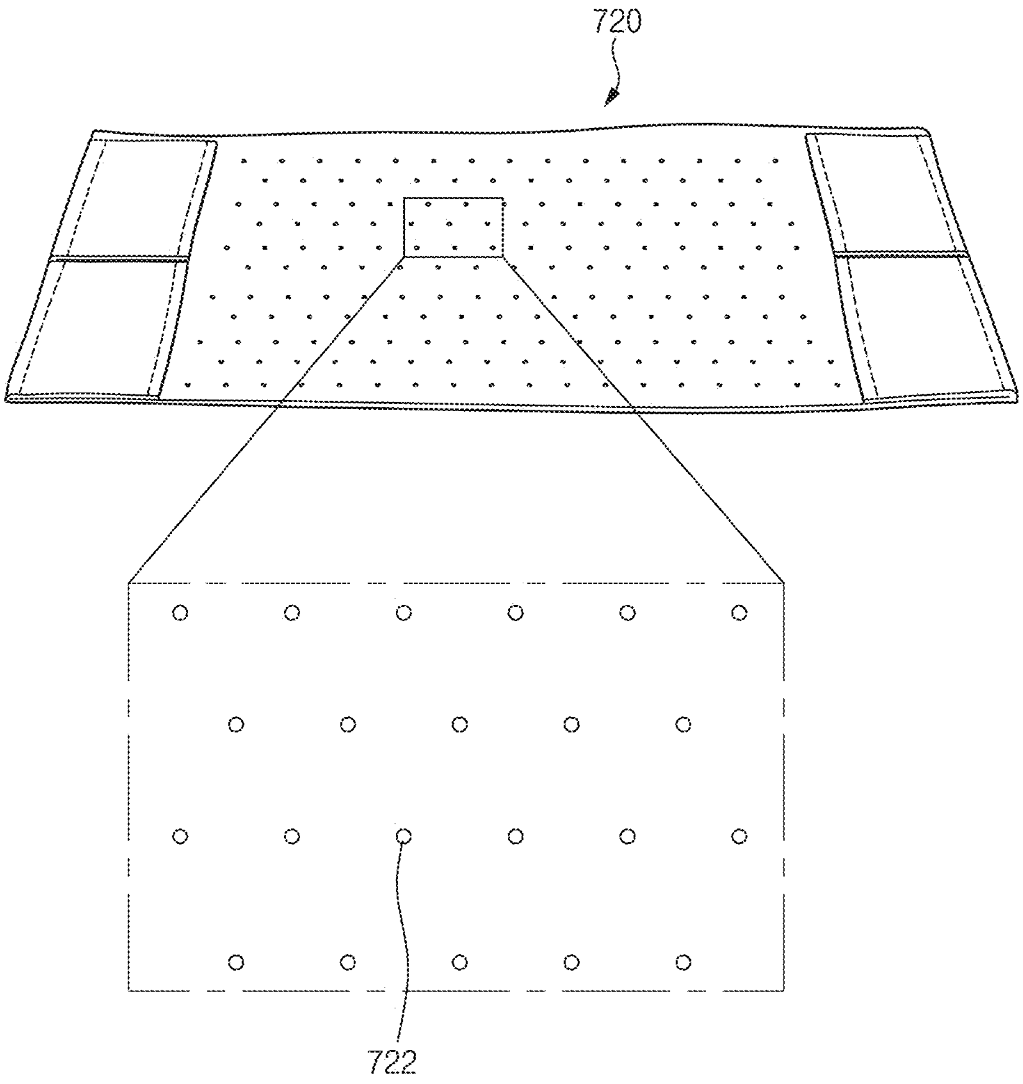
FIG. 8 is a perspective view illustrating a cooling part using an air pocket of the flexible actuator of FIG. 7A.

FIG. 8 is a perspective view illustrating a cooling part using an air pocket of the flexible actuator of FIG. 7A.

Referring to FIG. 8, the air pocket 720 which is a cooling part may be, for example, an air bag which can be manufactured by overlapping two layers of fabric, and the air pocket 720 has s structure in which a plurality of air holes 722 are formed on one or both sides to spray the induced air like a shower.

The air holes 722 may be formed artificially, but same effect may be obtained due to the characteristics of the material such as a porous material.

Figure 9A:
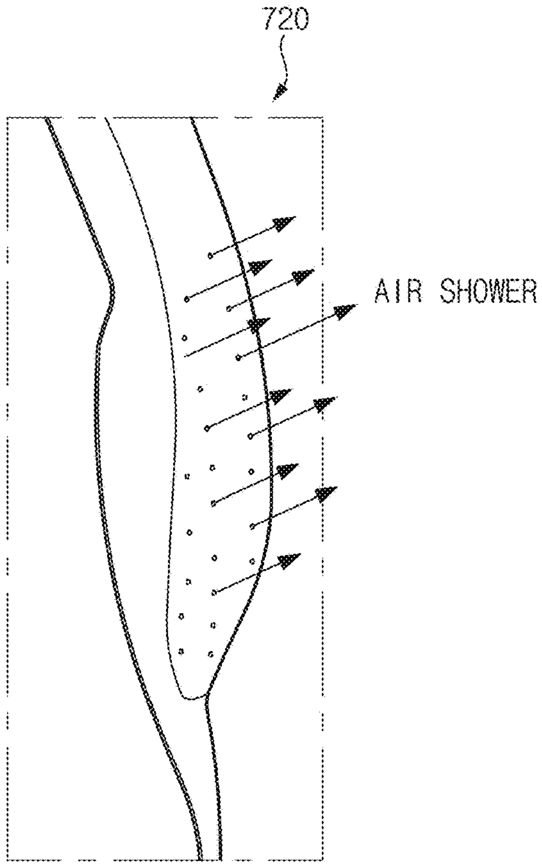
FIG. 9A is a schematic view illustrating the air pocket of FIG. 8 injecting a cooling air with an air shower.
Figure 9B:
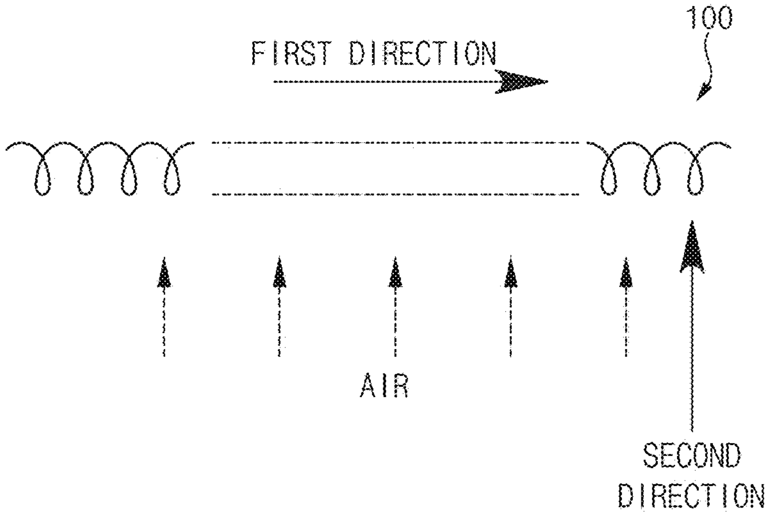
FIG. 9B is a schematic view illustrating a contact state between the cooling air of FIG. 9A and the flexible actuator of FIG. 7A.

FIG. 9A is a schematic view illustrating the air pocket of FIG. 8 injecting a cooling air with an air shower, and FIG. 9B is a schematic view illustrating a contact state between the cooling air of FIG. 9A and the flexible actuator of FIG. 7A.

As illustrated in FIG. 9A and FIG. 9B, when the first direction is assumed to a direction along which the SMA spring extends as a bundle, the air discharged from the air pocket 720 is sprayed over a significant portion of the entire length of the SMA spring bundle in a second direction (arrow direction) that is not parallel to the first direction but intersects or perpendicular to the first direction and contacts each other.

Conventionally, when the cooling air flows substantially the same direction to the longitudinal direction of the spring, the cooling effect was reduced as the temperature of the cooling air increased toward the lower end of the flow.

Thus, in the present example embodiment, as illustrated in the figure, the air flows in the direction intersecting or perpendicular to the extending direction of the SMA spring, and it adopts a cooling air flow structure in a form of an air shower like how water is sprayed from a shower. Thus, the problem in the conventional technology explained above may be easily solved.

Figure 10:
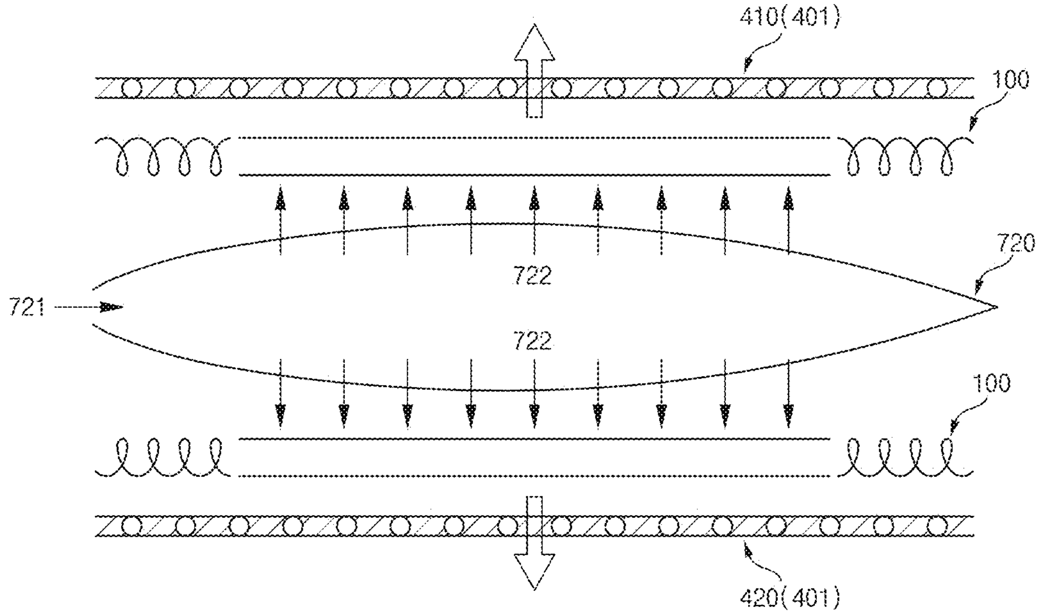
FIG. 10 is a cross-sectional view illustrating a cooling state of the flexible actuator of FIG. 7A using the air pocket of FIG. 8.

FIG. 10 is a cross-sectional view illustrating a cooling state of the flexible actuator of FIG. 7A using the air pocket of FIG. 8.

As illustrated in FIG. 10, when the SMA spring fabrics 100 extend along the first direction between an upper cover 410 and a lower cover 420 of the outer part 401, the air pocket 720 is disposed between the SMA spring fabrics 100 and then the air pocket 720 provides the air along the second direction (arrow direction) substantially perpendicular to the first direction.

Thus, due to the cooling air flow structure like the air shower, the SMA spring fabric 100 may be effectively cooled and a fast cooling control may be performed. Thus, the relaxation control for the SMA spring fabric 100 may be performed rapidly.

In the cooling method of the present example embodiment, the relaxation or the contraction of the SMA spring bundle may not be interfered. The external air is provided through air inlets 721 formed at a side of the air pocket 720, and the inlet air passes through the air pocket 720 and then is discharged through air outlets 722. Thus, the air performs an air shower to the SMA spring fabric 100, which is a forced convection cooling, and then the air is discharged through the over part 410 and 420.

Here, the external air may be provided by a fan or a blower.

The air outlets 722 of the air pocket 720 may be uniformly formed to spray the air to the SMA spring fabric 100 uniformly. Alternatively, the air outlets 722 may be formed more in an area corresponding to the relaxation state of the SMA spring fabric 100, considering the relaxation state.

Here, although the upper cover 410 or the lower cover 420 of the flexible actuator 11 are explained as having the air pocket structure, an additional air pocket may be installed while maintaining the structure of the conventional flexible actuator 11 as it is.

Further, in addition to the flexible actuator 11, the air pocket structure explained above may also be applied to the flexible actuators 10 and 12 explained above referring to FIG. 4 and FIG. 7B.

Figure 11A:
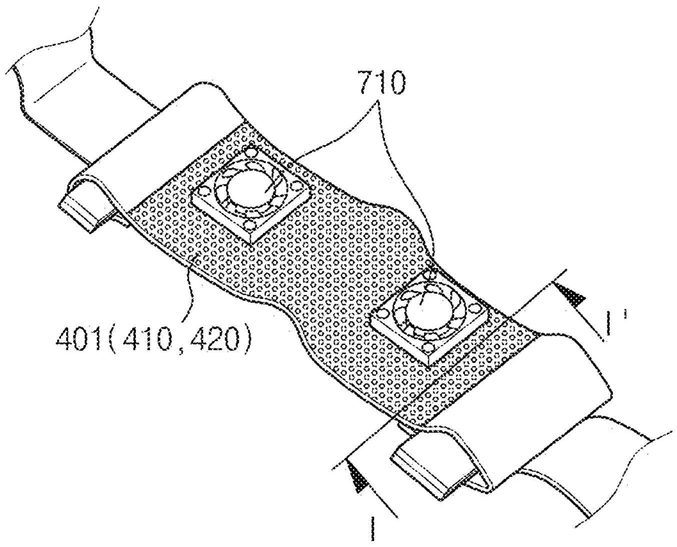
FIG. 11A is a perspective view illustrating another example cooling part of the flexible actuator of FIG. 7A.
Figure 11B:
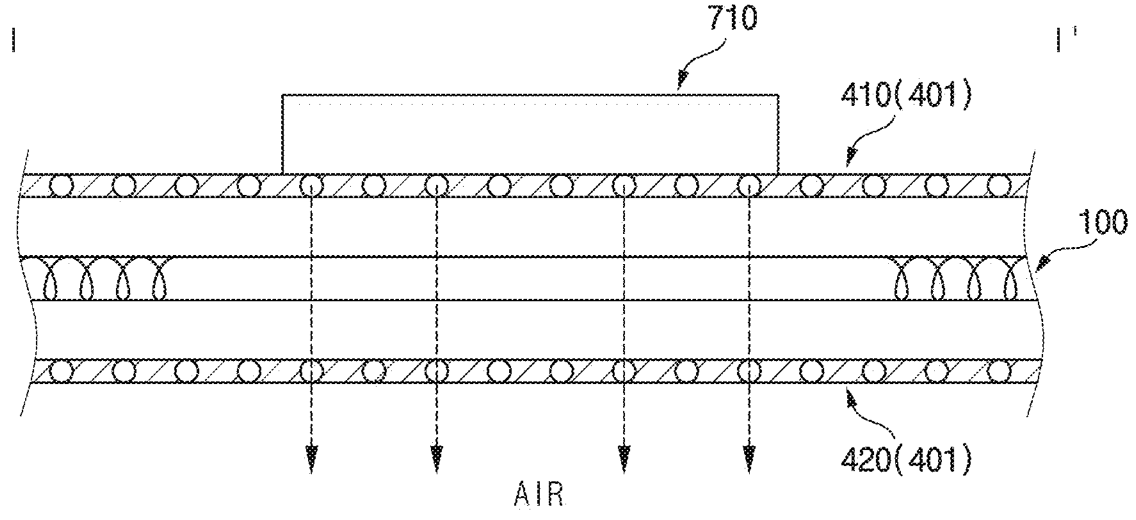
FIG. 11B is a cross-sectional view taken along a line I-I" of FIG. 11A.

FIG. 11A is a perspective view illustrating another example cooling part of the flexible actuator of FIG. 7A, and FIG. 11B is a cross-sectional view taken along a line I-I" of FIG. 11A.

Referring to FIG. 11A and FIG. 11B, an external air supplier 710, for example a cooling part like a fan, may be directly attached to a side of the flexible actuator 11.

Here, the direction of the external air provided by the external air supplier 710, as explained above, may intersect or be perpendicular to the extending direction of the SMA spring fabric 100.

For contact in the cross or orthogonal direction, an area in which the external air supplier 710 is located overlaps with an area in which the SMA spring fabric 100 is located. Further, the external air supplier 710 is located in an area corresponding to the relaxation state of the SMA spring fabric 100, for the effective relaxation operation.

In addition, for smooth air circulation, the outer part 401 of the flexible actuator 11 may include a porous material through which the air generated from the external air supplier 710 directly passes through the SMA spring 100 and then discharges to outside.

Here, when the outer part 401 includes the upper cover 410 and the lower cover 420, both of the upper and lower covers 410 and 420 may include the porous material. Thus, as illustrated in FIG. 11B, at least one external air supplier 710 may be used for the forced convection air cooling. Here, the external air supplier 710 is attached on one surface of the SMA spring fabric 100, and the air provided from the external air supplier 710 passes through the upper cover 410 and then passes through the SMA spring fabric 100 with the forced convection air cooling. Then, the air passes through the lower cover 420 and is discharged to outside.

Here, the external air supplier 710 may include a flexible material, and thus the relaxation and contraction operation of the SMA spring fabric 100 may not be interfered by the external air supplier 710, even though the external air supplier 710 is attached on the flexible actuator 11.

Figure 12:
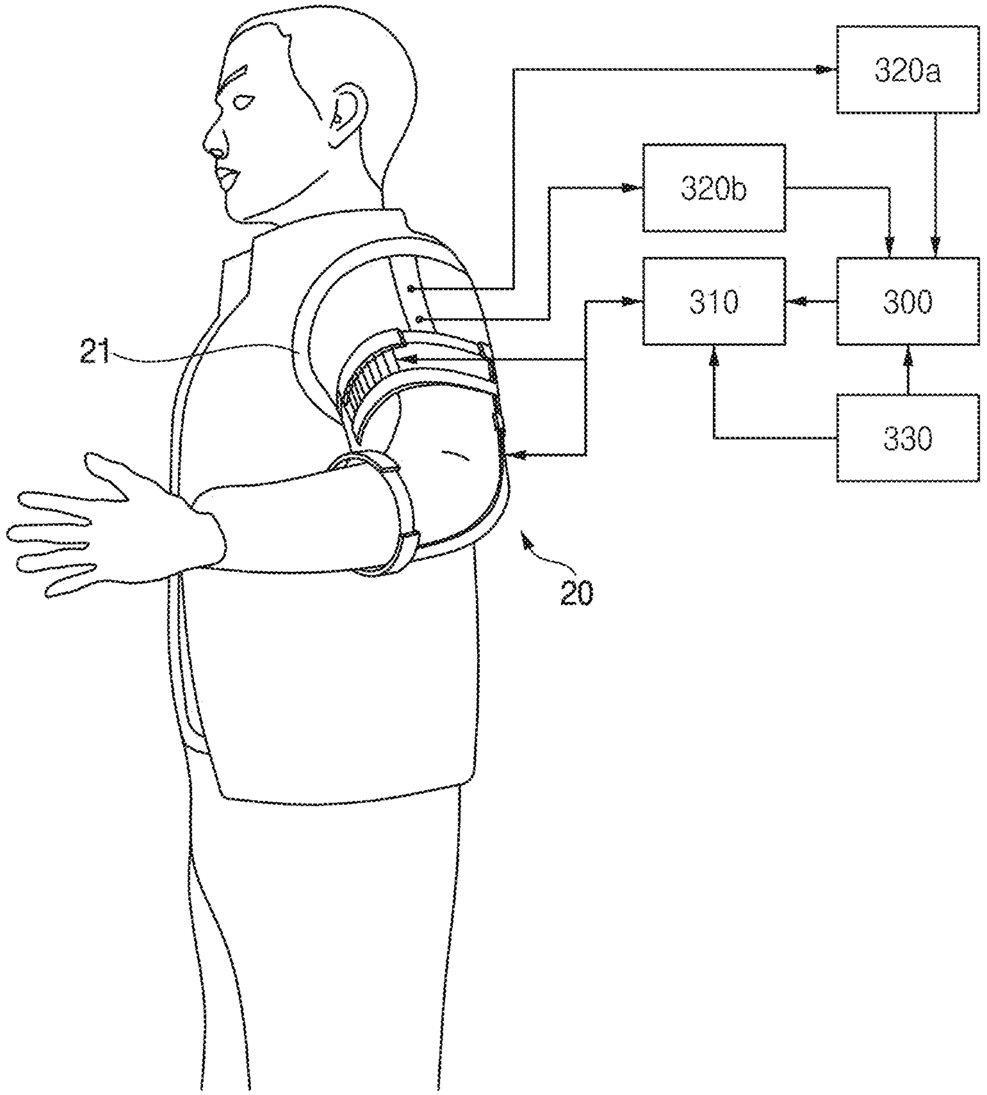
FIG. 12 is a schematic view illustrating a wearable robot having the flexible actuator of FIG. 4.

FIG. 12 is a schematic view illustrating a wearable robot having the flexible actuator of FIG. 4.

Referring to FIG. 12, the wearable robot 20 (or robot for muscle strength) includes a cloth body 21, and the flexible actuator 10 connected to the cloth body 21. Here, the flexible actuator 10 is explained above, and may be integrally formed with the cloth body 21 instead of being connected to the cloth body 21.

Here, the flexible actuator may be the flexible actuators explained above referring to FIG. 4, FIG. 7A and FIG. 7B.

The cloth body 21 is a part forming the base of the clothing used in the robot for strengthening muscle strength, and here the top is explained as an example but not limited thereto, and the cloth body 21 may be applied to the bottom or other garments too.

The cloth body 21 includes an inner part and an outer part, and the flexible actuator 10 may be disposed between the inner part and the outer part. The flexible actuator 10 may be disposed adjacent to a position corresponding to a joint of the user in the cloth body 21.

The cloth body 21 includes first and second body fixing parts. The first and second body fixing parts are disposed at both opposite sides with respect to the location of the cloth body 21 corresponding to the joint of the user. For example, when the joint is an elbow, the first body fixing part may be disposed in a position of an upper arm and the second body fixing part may be disposed in a position of a lower arm.

Here, a first side of the flexible actuator is fixed to the first body fixing part, and a second side of the flexible actuator is fixed to the second body fixing part.

Each of the first and second body fixing parts includes a band, and the band covers the arm of the user, for an artificial muscle to be tightly attached to the arm, or for the first and second body fixing parts to be fixed stably on the body of the user.

Referring to FIG. 12, the wearable robot 20 includes a sensor 320*a* or 320*b* configured to measure a movement of the user. A controller 300 of the wearable robot 20 controls a power supply 310 so that the power supplied to the thermal reaction drive element is blocked and the power is supplied to the cooling part, when the sensor senses the relaxation movement of the user.

The wearable robot 20 according to the present example embodiment includes a pair of first and second flexible actuators. Here, when the user wears the wearable robot 20, the first and second flexible actuators are disposed to face each other, for the first and second flexible actuators to be disposed at the inner side and the outer side of the arm (or a leg) respectively. Here, the controller of the wearable robot controls the first flexible actuator to be contracted and the second flexible actuator to be relaxed, when the predetermined movement of the user, for example the bending movement of the arm or the leg, is measured.

The controller controls the power supplier to supply the power to the thermal reaction drive element of the first flexible actuator, and/or controls the power supplier to block the power supply to the thermal reaction drive element of the second flexible actuator and to supply the power to the cooling part of the second flexible actuator at the same time.

The wearable robot 20 may further include the power supplier 310, a sensing part 320 and a power source 330, in addition to the sensor 320*a* or 320*b* and the controller 300.

Here, the sensor 320*a* or 320*b*, the controller 300, the power supplier 310, the sensing part 320 and the power source 330 may be included in the flexible actuator 10.

The controller 300 controls the power supply to the SMA spring fabric 100, so that the SMA spring fabric 100 may be operated from the relaxation state to the contraction state, or from the contraction state to the relaxation state.

For example, the controller 300 controls the power supply to the SMA spring fabric 100 via the power supplier 310. When the controller 300 provides a power supply signal to the power supplier 310, the power supplier 310 provides a current to the SMA spring fabric 100. In addition, when the controller 300 stops providing the power supply signal to the power supplier 310, the power supplier 310 stops providing the current to the SMA spring fabric 100.

Based on the control of the power supplier 310, the heat is generated and the SMA spring fabric 100 is contracted when the current is provided to the SMA spring fabric 100, and the temperature is decreased and the SMA spring fabric 100 is relaxed when the supply of the current is interrupted.

The power supplier 310 is a current driver connected to the flexible actuator 10 and configured to provide the current to the thermal reaction drive element, and any further explanation on the power supplier 310 may be omitted.

The sensing part 320 includes a sensor configured to sense a vital sign of the user or an operation of the user. Here, the vital sign may include electromyography.

For example, when the sensing part 320 may include an electromyography sensor, the sensor may measure the movement or action (specifically, contraction or relaxation) of the user's muscles according to the gripping, moving and holding of a heavy object. Alternatively, the sensing part 320 may include a voice sensor, and the voice sensor may receive the user's behavior, status, requirement and so on via voice information.

In addition, the sensing part 320 may include a sensor configured to sense deformation of the SMA spring fabric 100. For example, the sensing part 320 may include a strain gauge. Further, the sensing part 320 may include a sensor configured to sense a temperature of the SMA spring fabric 100, and thus this may be usefully used in a massage device that performs a fan driving according to the temperature by repeating a relaxation operation and a contraction operation.

The power source 330 is configured to provide a power to at least one of the controller 300, the power supplier 310 and the sensing part 320.

The controller 300 controls the current provided to the thermal reaction drive element from the power supplier, based on the sensing information of the sensing part 320.

For example, when the operation requiring the contraction of the SMA spring fabric such as the bending of the arm of the user is performed, the sensing part 320 may provide the sensing information on the electromyography to the controller 300, and then the controller 300 may decide that the user intends to bend his arm based on the electromyography sensing information. In addition, the controller 300 may calculate the force required to bend the arm of the user, and then may output a target force outputted by the flexible actuator 10. In addition, to perform the above operation, the controller 300 may control the current provided to the SMA spring fabric, to output the target force.

The controller 300 may control the power supplier to block the power supply to the SMA spring fabric 100 and to provide the power supply to the cooling part, when the SMA spring fabric 100 changes to the relaxation state.

Accordingly, the power supply to the SMA spring fabric is interrupted and the temperature of the SMA spring fabric starts to be decreased, and then the SMA spring fabric starts to be relaxed. At the same time, the power is supplied to the cooling part and a cooling air supplying device such as a fan starts to be operated. Further, as the temperature of the SMA spring fabric is decreased more, the relaxation speed of the SMA spring fabric may be increased. Thus, the cooling air supplying device should be maintained as an ON state, considering the above operation state of the flexible actuator.

Figure 13:
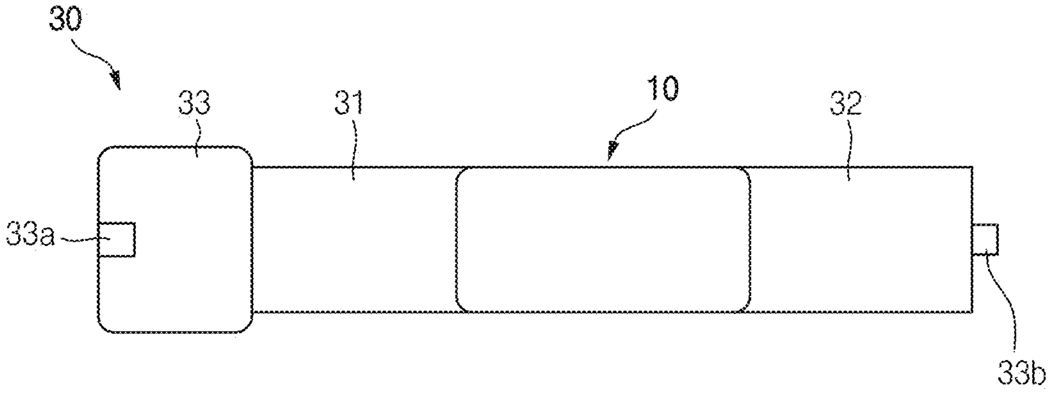
FIG. 13 is a plan view illustrating a massage device having the flexible actuator of FIG. 4.
Figure 14:
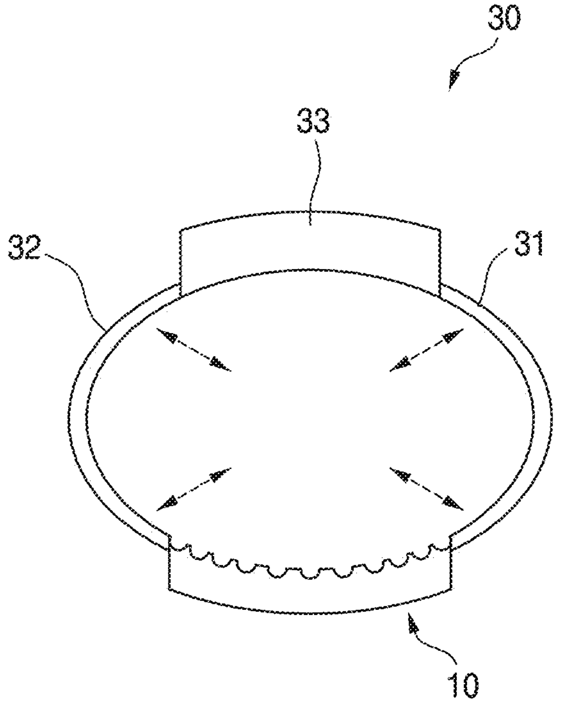
FIG. 14 is a side view illustrating an operation of the massage device of FIG. 13.

FIG. 13 is a plan view illustrating a massage device having the flexible actuator of FIG. 4. FIG. 14 is a side view illustrating an operation of the massage device of FIG. 13.

The massage device 30 connects both ends of the clot-type actuator, and may function as the massage device that tightens and loosens the calves, wrists and waist.

Referring to FIG. 13 and FIG. 14, the massage device 30 includes at least one elastic band 31 and 32, and the flexible actuator 10 connected to the elastic band 31 and 32.

First and second elastic bands 31 and 32 are respectively connected to first and second sides of the flexible actuator 10. Here, a controller and/or a power source 33 may be connected to a first side of the first elastic band 31. In addition, a power connector 33*b* may be formed at a first side of the second elastic band 32 and the power connector 33*b* may be connected to other connector 33*a* formed at the power source 33. Thus, when the power connectors 33*a* and 33*b* are connected based on the above connection, the power source 33 may provide the power source to the flexible actuator 10.

Referring to FIG. 14, the controller measures the temperature of the SMA spring fabric 100 inside of the flexible actuator 10 and adjusts the amount of the supplied current while controlling the temperature of the SMA spring fabric 100, and then the controller controls the contraction force of the SMA spring fabric 100 to adjust the tightening force of the massaging portion.

Here, as the SMA spring fabric 100 of the flexible actuator 10 is contracted, the tightening of the massing portion may be increased as illustrated in the arrow. In contrast, as the SMA spring fabric 100 is relaxed, the tightening of the massing portion may be decreased and released as illustrated in the arrow.

The controller controls a supply state of current and cooling air provided to the SMA spring fabric 100 according to the tightening and unfastening time of the massage device, which is the ON-OFF state.

For example, in the unfastening state of the massage device, the controller may stop supplying the current to the SMA spring fabric 100 (OFF) and stop supplying the cooling air (OFF). In the transition from the unfastening state to the tightening state, the controller may supply the current to the SMA spring fabric 100 (ON) and stop supplying the cooling air (OFF). In the transition from the tightening state to the unfastening state, the controller may stop supplying the current to the SMA spring fabric 100 (OFF) and supply the cooling air (ON). Alternatively, the cooling air may always be in the supply state (ON), depending on the operating environment or method.

According to the embodiments of the present invention mentioned above, the SMA spring fabric is tightly woven, so that a large number of the SMA springs per unit area may be arranged with uniform density. In addition, the large number of the SMA spring arrangement enables larger force to be generated, and the uniform SMA spring arrangement also improves cooling performance.

Here, the SMA spring fabric may be easily woven through the conventional weaving machine, and thus productivity and the process efficiency may be increased. In addition, the user may redesign the fabric into various shapes or sizes, if the form of the fabric is provided to the user. Thus, the design freedom may be increased and the usability may be excellent.

In addition, the cooling air is provided along a direction perpendicular to the extending direction of the SMA spring fabric, so that the SMA spring fabric may be cooled rapidly. Thus, the response of the flexible actuator in the relaxation operation may be improved.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A fabric configured to be contracted or relaxed by external power supply, a relaxation length of the fabric being limited by a relaxation length limiting part, the fabric comprising:

a thermal response drive element having a spring shape, and configured to function as one of a warp and a weft; and a wire configured to function as the remaining of the warp and the weft, wherein the fabric is woven using the spring-shape thermal response drive element, in a state having a core wire to be removed later, as the warp or the weft.

2. The fabric of claim 1, wherein the thermal response drive element is a shape memory alloy (SMA) spring.

3. The fabric of claim 2, wherein the SMA spring has flexibility and is woven in close contact with each other within the fabric, and the wire is configured to fix the SMA spring.

4. A manufacturing method for a fabric, the fabric configured to be contracted or relaxed by external power supply, a relaxation length of the fabric being limited by a relaxation length limiting part, the method comprising:

continuously winding a wire corresponding to a thermal response drive element around a core wire to be removed later, in a form of a spring;

heat-treating the wire in the form of the spring wound around the core wire and storing the wire in a spring-shaped form;

weaving the fabric using a separately prepared non-conductive wire and the spring-shaped wire wound around the core wire; and removing the core wire from the woven fabric, wherein the fabric is woven using the wire of the thermal response drive element, in a state having the core wire to be removed later, as a warp or a weft.

5. The manufacturing method of claim 4, wherein in weaving the fabric, the spring-shaped wire wound around the core wire is used as one of a warp and a weft, and the non-conductive wire is used as the remaining of the warp and the weft.

6. The manufacturing method of claim 5, wherein in removing the core wire, the core wire is dissolved and removed by acid.

7. A flexible actuator comprising:

a fabric comprising a thermal response drive element and a wire, wherein the thermal response drive element has a spring shape and is configured to function as one of a warp and a weft, and the wire is configured to function as the remaining of the warp and the weft;

a controller configured to control a power supply to the fabric; and a relaxation length limiting part configured to limit a relaxation length of the fabric, wherein the fabric is configured to contracted or relaxed by the power supply, and wherein the fabric is woven using the spring-shape thermal response drive element, in a state having a core wire to be removed later, as the warp or the weft.

8. The flexible actuator of claim 7, wherein the fabric is contracted or relaxed along a direction in which the thermal response drive element having the spring shape extends.

9. The flexible actuator of claim 8, wherein the relaxation length limiting part is a wire extending along an extending direction of the fabric from at least one of both sides of the fabric.

10. The flexible actuator of claim 8, further comprising an outer part configured to cover at least one side of the fabric to locate the fabric inside, and configured to limit the relaxation length of the fabric.

11. The flexible actuator of claim 7, further comprising:

a conductive pad overlapping with an end of the fabric and electrically connected to the fabric; and a current receiver connected to the conductive pad and configured to provide the power supply to the conductive pad.

12. The flexible actuator of claim 11, wherein the conductive pad is fixed to a supporting fabric, and the supporting fabric is contracted or relaxed according to the contraction or the relaxation of the fabric.

13. The flexible actuator of claim 7, further comprising a cooling part configured to provide an air in a direction crossing an extending direction of the thermal response drive element of the fabric, to cool the fabric.

14. The flexible actuator of claim 13, wherein the cooling part is an air pocket configured to provide an external air toward the fabric, wherein the air pocket comprises an air inlet through which the external air is introduced, and an air outlet through which the introduced air is discharged toward the fabric.

15. The flexible actuator of claim 13, wherein the cooling part is an external air supplier disposed at a side surface of the flexible actuator, and an area in which the external air supplier is located overlaps with an area in which the fabric is located.

16. The flexible actuator of claim 15, wherein the external air supplier is located to overlap with an area in which the fabric is located with the fabric contracted.

17. The flexible actuator of claim 13, wherein the outer part has a porous material through which the air provided to the fabric passes.

18. A wearable robot comprising:

a cloth body; and the flexible actuator of claim 7, connected to the cloth body or integrally formed with the cloth body, wherein a first side of the flexible actuator is disposed at a first body fixing portion and a second side of the flexible actuator is disposed at a second body fixing portion, and the second body fixing portion is disposed opposite to the first body fixing portion with respect to a position corresponding to a joint in the cloth body.

19. A massage device comprising:

an elastic band; and the flexible actuator of claim 7 connected to the elastic band.

* * * * *